United States Patent [19]

Spangler

[11] Patent Number: 5,335,424
[45] Date of Patent: Aug. 9, 1994

[54] GAUGE FOR MEASURING RADIAL DISTANCES ON A CYLINDRICAL SURFACE

[76] Inventor: David Spangler, 7641 Aberdeen, Prairie Village, Kans. 66208

[21] Appl. No.: 34,511

[22] Filed: Mar. 19, 1993

[51] Int. Cl.⁵ .............................. G01B 3/22; G01B 5/06
[52] U.S. Cl. ........................................ 33/834; 33/572; 33/614
[58] Field of Search ................. 33/832, 833, 834, 836, 33/838, 523, 614, 617, 618, 551, 572, 792, 794, 795, 803, 711, 501.02, 501.08

[56] References Cited

U.S. PATENT DOCUMENTS

| | | | |
|---|---|---|---|
| 1,692,243 | 11/1928 | Belkmann et al. | 33/501.02 |
| 2,224,728 | 12/1940 | Gulliksen | 33/501.02 |
| 2,375,448 | 5/1945 | Talbot et al. | 33/838 |
| 2,456,003 | 12/1948 | Knutson | 33/572 |
| 2,506,924 | 5/1950 | Huber | 33/572 |
| 2,840,918 | 7/1958 | Wildeman | 33/834 |
| 3,217,418 | 11/1965 | Wennerberg | 33/572 |
| 3,442,478 | 5/1969 | Parapetti | 33/833 |
| 4,554,747 | 11/1985 | Williams | 33/832 |
| 5,075,980 | 12/1991 | Kerman | 33/618 |
| 5,084,983 | 2/1992 | Proffit et al. | 33/572 |

*Primary Examiner*—Thomas B. Will
*Attorney, Agent, or Firm*—Hovey, Williams, Timmons & Collins

[57] ABSTRACT

An apparatus for measuring radial distances relative to the surface of a cylinder includes a chassis supported on the cylinder by at least three wheels, at least one of which is rotatable about an axis different from the axes about which the remaining wheels rotate, and all of which are spaced from one another in a direction parallel to the longitudinal axis of the cylinder. A gauge is provided for measuring radial distances relative to the surface of the cylinder when the chassis is supported on the cylinder by the wheels, the gauge being supported on the chassis in such a way as to allow adjustment both of the height of the gauge relative to the chassis and of the position of the gauge relative to the chassis in a direction parallel to the axis of the cylinder.

7 Claims, 3 Drawing Sheets

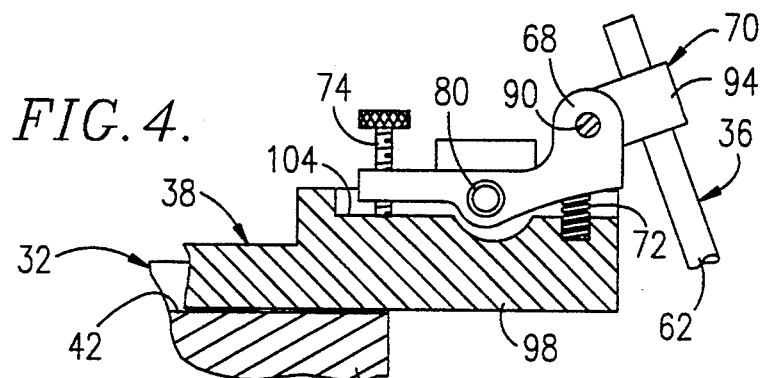
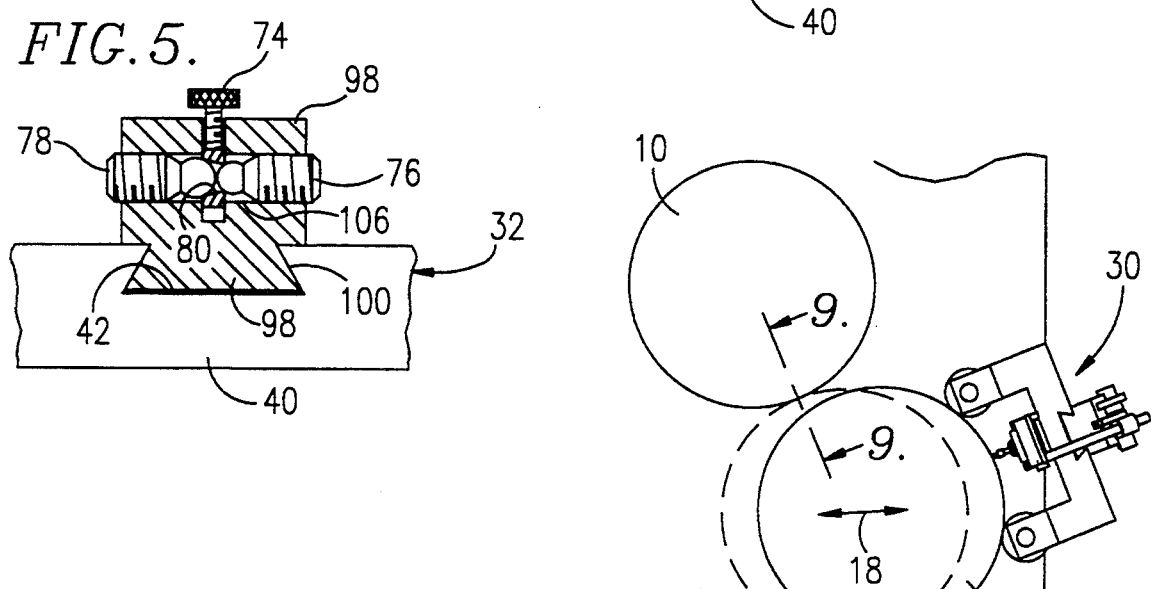
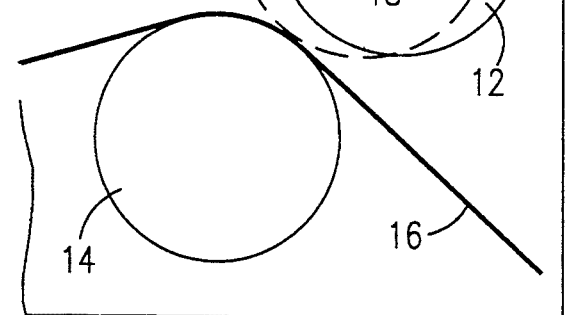
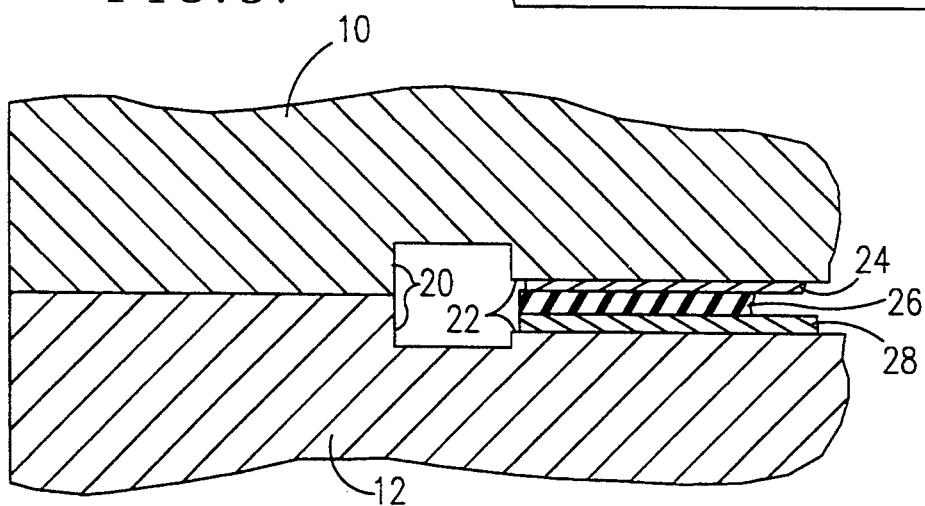

GAUGE FOR MEASURING RADIAL DISTANCES ON A CYLINDRICAL SURFACE

BACKGROUND OF THE INVENTION

1. Field of the Invention

The present invention relates generally to distance measuring devices and, more particularly, to an apparatus for measuring radial distances relative to the surface of a cylinder, e.g. the transfer cylinder of an offset printing press.

2. Discussion of the Prior Art

In an offset printing press, an image is formed on a plate cylinder, and is transferred to a blanket or transfer cylinder which applies the image to a sheet or web that is passed between the transfer cylinder and an impression cylinder.

The plate, transfer and impression cylinders used in the printing press are each provided with bearers at each axial end thereof and a central circumferential section that is recessed slightly in the radial direction relative to the bearers. A plate is supported on the central circumferential section of the plate cylinder, while a blanket and possibly additional layers of packing material are supported on the central circumferential sections of the plate and transfer rollers.

In order to achieve high quality printing, it is desirable to provide a particular amount of squeeze at the nip between the plate and transfer cylinders, as well as at the nip between the transfer and impression cylinders. For example, in a typical offset printing operation a squeeze of 0.003 inches is desired between the plate and transfer cylinders, and a squeeze of between 0.005-0.007 inches is sought between the transfer cylinder and the web or sheet that is passed between the transfer cylinder and the impression cylinder.

When initially setting up the press for operation, the thicknesses of the plate, blanket, and web are known. However, in order to obtain the desired squeeze pressures, it is necessary to determine the overall height of the blanket and packing material on the transfer cylinder so that the thickness of the packing material may be adjusted to provide the desired squeeze between the blanket and plate.

It is conventional to use an elongated, V-shaped bar for carrying out such measurements on the transfer cylinder. The bar is inverted and placed on the surface of the transfer cylinder so that an end of the bar abuts one of the bearers to provide a point from which a radial measurement may be made with a conventional measuring device.

Numerous problems arise during use of this conventional arrangement. For example, because the bar rests in edge contact on the cylinder surface, the bar is unstable. This problem is typically most evident when a high spot exists on the transfer roller, causing the bar to become wobbly such that the point from which a measurement is to be made cannot be isolated.

The instability of the V-shaped bar also introduces a problem in that it is difficult to accurately align the center line of the bar with the longitudinal axis of the cylinder. The inability to provide this alignment reduces the accuracy of measurements taken off of the bar, and adversely effects the repeatability of measurements.

OBJECTS AND SUMMARY OF THE INVENTION

It is an object of the present invention to provide an apparatus capable of providing reliable and repeatable measurements of various relative radial heights on the surface of a cylinder.

It is another object of the invention to provide an apparatus which may be supported in a stable position on a cylinder so that various radial measurements may be made along the length of the cylinder.

In accordance with these and other objects, an apparatus is provided for measuring radial distances relative to the surface of a cylinder. The apparatus includes a chassis provided with a body having a center line adapted to be aligned parallel with the longitudinal axis of the cylinder, and first, second and third wheels for supporting the chassis on the cylindrical surface. The first and second wheels are rotatable about a first axis of rotation and the third wheel is rotatable about a second axis of rotation parallel to the first axis of rotation and disposed to a side of the center line opposite the first axis. The first, second and third wheels are offset from one another in the direction of the center line.

The apparatus also includes a gauge for measuring radial distances relative to the surface of the cylinder when the chassis is supported on the cylinder by the wheels, and a means for supporting the gauge on the chassis. The support means includes a height adjustment means for adjusting the height of the gauge relative to the chassis and a slide adjustment means for adjusting the position of the gauge relative to the chassis in a direction parallel to the center line.

By providing this construction, numerous advantages are achieved. For example, by constructing the chassis with wheels which are offset from one another in the direction of the center line of the body, three-point support is provided for the chassis, enabling the apparatus to be positioned on the cylinder in accurate alignment with the longitudinal axis, and providing stability to the chassis so that it does not rock back-and-forth relative to the cylinder during use.

BRIEF DESCRIPTION OF THE DRAWING FIGURES

A preferred embodiment of the present invention is described in detail below with reference to the attached drawing figures, wherein:

FIG. 4 is a sectional view taken along line 4—4 of FIG. 3;

FIG. 5 is a sectional view taken along line 5—5 of FIG. 1;

FIG. 8 is a schematic side elevational view of an offset printing press, illustrating the apparatus in working relationship with the transfer cylinder;

FIG. 9 is a sectional view along line 9—9 of FIG. 8, illustrating the nip between the plate and transfer cylinders of the press during printing.

DETAILED DESCRIPTION OF THE PREFERRED EMBODIMENT

Figure 2:
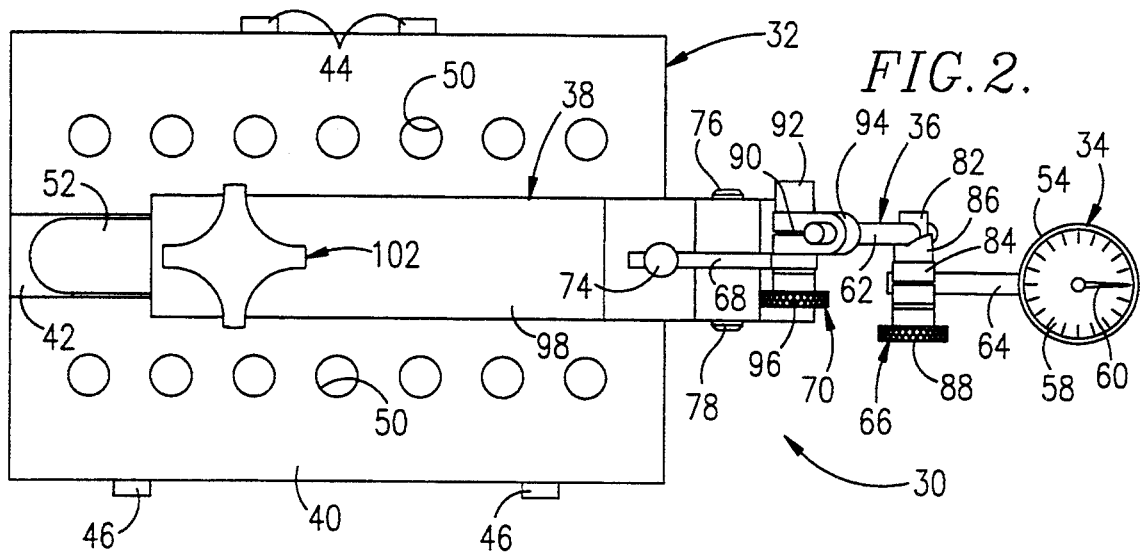
FIG. 2 is a top plan view of the apparatus.

An offset printing press is illustrated in FIG. 8, and includes a plate cylinder 10, a transfer cylinder 12 and an impression cylinder 14. During operation, an image is formed on the plate cylinder, and is transferred to the transfer cylinder which applies the image to a sheet or web 16 that is passed between the transfer cylinder and the impression cylinder.

The transfer cylinder 12 may be moved into and out of engagement with the plate cylinder along the line 18 in order to permit set up of the press. During set up, a blanket and packing material is wrapped onto the transfer cylinder and secured in place so that a desired squeeze pressure is exerted at the nips between the transfer cylinder and the plate and impression cylinders.

As shown in FIG. 9, the plate cylinder 10 and transfer cylinder 12 each include bearers 20 at each axial end thereof and a central circumferential section 22 that is recessed slightly in the radial direction relative to the bearers. The impression cylinder 14 is preferably constructed in an identical fashion.

A plate 24 is supported on the central circumferential section of the plate cylinder, while a blanket 26 and possibly additional layers of packing material 28 are supported on the central circumferential sections of the plate and transfer cylinders. Although the plate 24 and blanket 26 are of known thicknesses, it is necessary to measure the overall height of the blanket and packing material on the transfer cylinder so that an operator may calculate the squeeze provided between the transfer and plate cylinders during printing.

A measuring apparatus 30 for this purpose, and constructed in accordance with a preferred embodiment of the present invention, is illustrated in working relation with the transfer cylinder 12 in FIG. 8. The apparatus is not secured to the cylinder, but rather is held on the cylinder surface by an operator during use so that he or she may make the necessary measurements.

Figure 1:
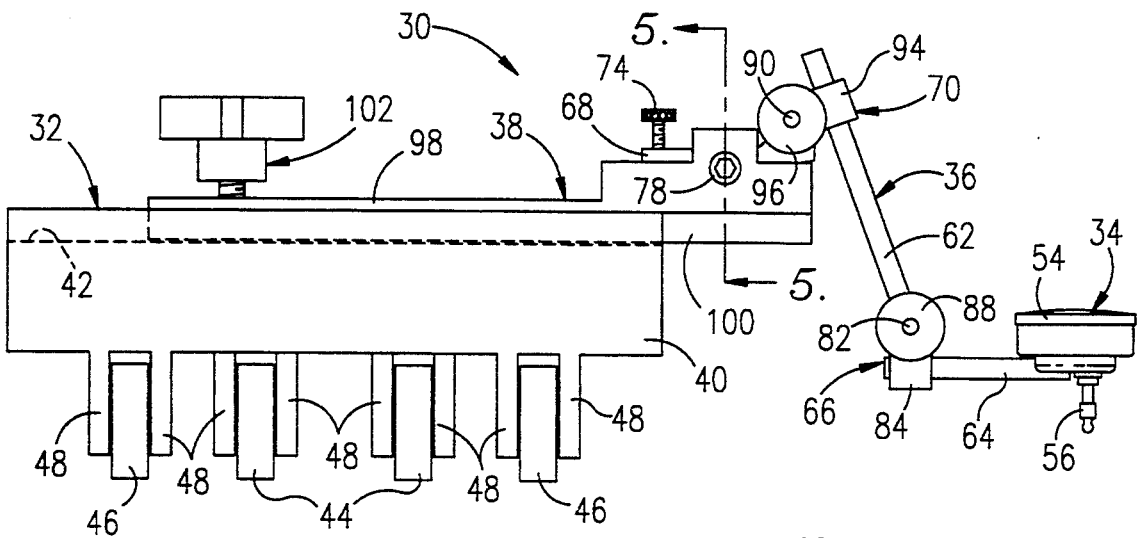
FIG. 1 is a side elevational view of a measuring apparatus constructed in accordance with the preferred embodiment.

Turning to FIG. 1, the apparatus 30 broadly includes a chassis 32, a gauge 34, and a support means for supporting the gauge on the chassis. Preferably, the support means includes a height adjustment assembly 36 for adjusting the height of the gauge 34 relative to the chassis and a slide arm assembly 38 for adjusting the position of the gauge relative to the chassis in the longitudinal direction.

Figure 3:
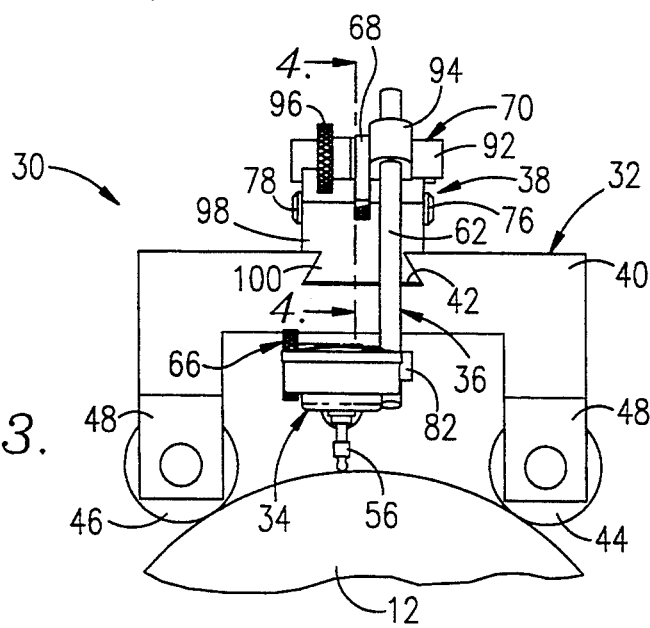
FIG. 3 is an end elevational view of the apparatus, illustrating the apparatus in working relation with a cylinder.

As shown in FIG. 3, the chassis 32 includes a channel-shaped body 40 formed of any rigid material, e.g. aluminum, and having an upper surface with a central, longitudinal, dove-tail groove 42 formed therein which defines a center line adapted to be aligned parallel with the longitudinal axis of the cylinder during use. Turning to FIG. 1, four wheels 44, 46 are mounted to the depending legs of the body, with all of the wheels being offset from one another in the direction of the center line so that, if the apparatus were to be rolled on the wheels, the paths followed by the wheels would not overlap one another.

Each wheel 44, 46 is preferably supported within a suitable bearing assembly between a pair of depending ears 48 formed in the body. The pair of wheels 44 on one of the legs of the body are supported for rotation about a common axis, which extends in a direction parallel with the center line. Likewise, the other pair of wheels 46 are also supported for rotation about a common axis. However, the two axes of rotation are spaced from one another on opposite sides of the center line, as illustrated in FIG. 3.

As shown in FIG. 2, a plurality of holes 50 are bored through the body to reduce the weight thereof if desired, and a steel insert 52 is provided in the bottom of the groove and defines a wear surface which permits the slide arm assembly 38 to be secured to the chassis without causing deformation of the body material.

The gauge 34 is illustrated in FIG. 1, and is of a conventional construction including a housing 54, a depending index finger 56 spring biased toward an extended position, and a dial 58, shown in FIG. 2, including a hand 60 operatively connected to the index finger for indicating the position of the index finger relative to the housing. Returning to FIG. 1, as the index finger 56 is forced upward toward the housing against the spring bias, the dial rotates, providing an indication of the amount of displacement of the index finger.

The dial 58 is rotatable relative to the hand so that the position of the indicia on the dial may be changed relative to the hand. Thus, the dial may be rotated to place the "zero" indicia in alignment with the hand at a first position of the index finger so that the distance traveled by the index finger between the first position and a second position can be measured.

The height adjustment assembly 36 preferably includes two elongated steel arms 62, 64 connected together by a first articulating joint 66. The gauge 34 is rigidly attached to the distal end of the lower arm 64 opposite the articulating joint 66, and the upper arm 62 is attached to a rocker arm 68 by an upper articulating joint 70 so that both arms 62, 64 are movable relative to both the chassis and each other to position the gauge at a desired radial distance relative to the surface of the cylinder when the chassis is supported on the cylinder.

As shown in FIG. 4, the rocker arm 68, is supported on the slide arm assembly 38 for pivotal movement about an axis extending in a direction transverse to the longitudinal axis of the cylinder and perpendicular to the radial distances to be measured. A compression spring 72 is seated between the slide arm assembly and an end of the rocker arm, and an adjustment screw 74 is provided on the rocker arm opposite the spring 72. The spring normally urges the rocker arm in the counter-clockwise direction, and the adjustment screw is threaded so that, when turned, it forces the rocker arm in the clockwise direction against the bias of the spring.

Turning to FIG. 5, the pivot axis of the rocker arm is illustrated as including a pair of opposed, ball-headed screws 76, 78 which are threaded into the slide arm assembly from opposite sides thereof to define a nip on the pivot axis. One of the balls 78 is oversized relative to the other ball 76, and the rocker arm 68 is formed with a tapered transverse hole 80, so that the rocker arm is positively retained on the ball-headed screws. Thus, the rocker arm may be pivoted but any lateral play or clearance between the rocker arm and ball-headed screws is removed. If desired, a compression spring having a diameter larger than the diameter of the small ballheaded screw 76 may be positioned between the ballheaded screw 76 and the rocker arm 68 to exert a lateral force on the rocker arm against the opposing screw 78. This assists in removing play at the pivot axis.

Returning to FIG. 2, the lower articulating joint 66 of the height adjustment assembly 36 includes a transverse shaft 82 and a U-shaped clamp 84. The shaft includes a transverse hole in one axial end thereof and threads formed on the opposite end. The clamp 84 includes a hole extending through the two legs of the clamp, through which the shaft 82 extends. Another hole perpendicular to the first is formed in the clamp between the legs for receiving the lower arm 64.

A spacer 86 is provided on the shaft 82 between the transverse hole and the clamp 84, and spaces the clamp from the upper arm 62 when the upper arm is received in the hole. A nut 88 is received on the threaded end of the shaft. During adjustment, the nut may be loosened to allow both axial and rotational movement of the lower arm 64 within the clamp, and to permit similar movement of the upper arm 62 within the transverse hole.

Once adjustment is complete, the nut 88 is tightened to secure the grip of the clamp on the arm, and to force the spacer 86 against the upper arm 62 to hold it in the transverse hole. A compression spring may be interposed between the clamp and the nut to assist in removing play within the joint.

The upper joint 70 includes an elongated shaft 90 having an enlarged end piece 92 at one axial end thereof and threads formed in the opposite end. A clamp 94 is received on the shaft 90 for supporting the upper arm 62 relative to the rocker arm 68. The rocker arm includes a hole through which the shaft 90 extends so that when the nut 96 is tightened, the rocker arm and clamp are pressed against the end piece 92, and the position of the joint relative to the rocker arm is secured. A compression spring may be interposed between the rocker arm and the nut to assist in removing play within the joint.

The slide arm assembly 38 is illustrated in FIG. 1, and includes an elongated slide arm 98 having a pair of lateral tapered grooves 100 formed into the sides thereof to define a dove-tail tenon, shown in FIG. 3, that mates with the groove 42 of the chassis 32 to permit sliding movement of the slide arm relative to the body.

Returning to FIG. 1, a transverse hole is formed in the arm adjacent one axial end thereof, through which a threaded adjustment screw 102 is provided. The adjustment screw engages the steel insert 52 in the bottom of the groove when tightened, in order to hold the slide arm in a desired position. The opposite end of the slide arm includes a longitudinal slot 104, shown in FIG. 4, within which the rocker arm 68 is received, and a transverse hole 106 within which the ball-headed screws are threaded, as shown in FIG. 5.

During set up of the printing press, if it is necessary to adjust the squeeze between the transfer cylinder 12 and the plate cylinder 10, the measuring apparatus may be employed to check the thickness of the blanket 26 and any packing material 28 on the transfer cylinder. Because the radial distance between the recessed central circumferential section 22 of the cylinder and the bearer 20 is known, it is possible to measure the overall height of the blanket by establishing the height of the bearer and measuring the radial height of the blanket surface relative to the bearer.

Figure 6:
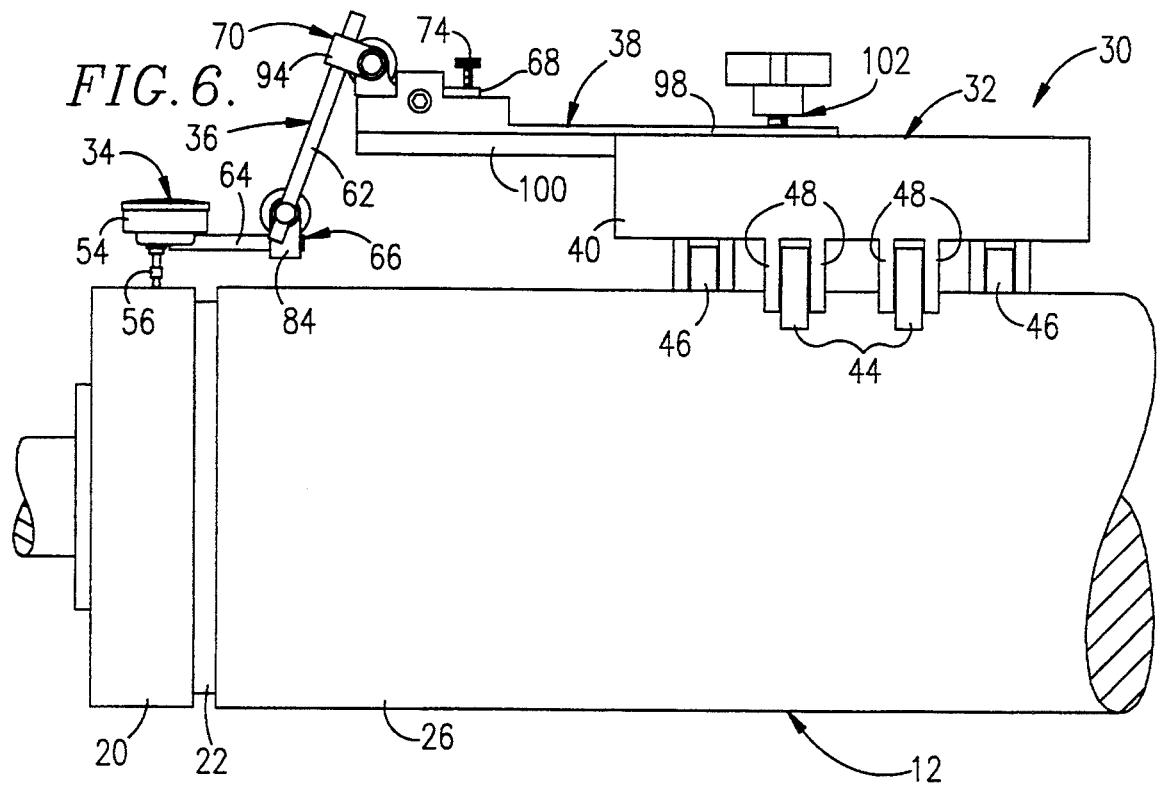
FIG. 6 is a side elevational view of the apparatus in working relation with the transfer cylinder of a printing press, illustrating the orientation of the apparatus when a measurement is taken of the radial dimension of a bearer of the cylinder.
Figure 7:
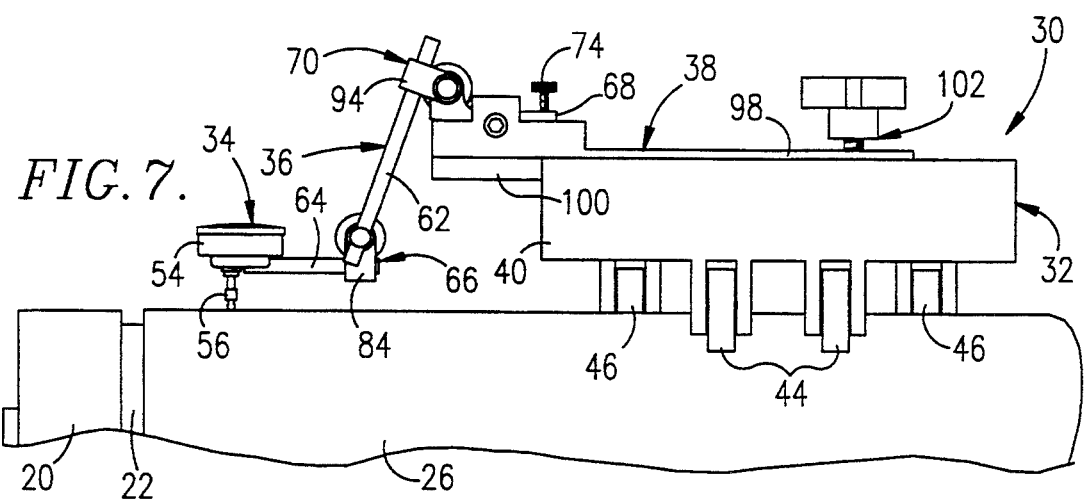
FIG. 7 is a side elevational view of the apparatus in working relation with the transfer cylinder of a printing press, illustrating the orientation of the apparatus when a measurement is taken of the radial dimension of a blanket on the cylinder relative to the bearer.

As shown in FIG. 6, the initial adjustment the measuring apparatus made to establish the height of the bearer includes positioning the chassis 32 on the transfer cylinder with the channel-shaped body 40 of the chassis saddling the cylinder and the wheels 44, 46 resting on the surface of the cylinder. Because of the arrangement of the wheels on the body, two of the wheels 44 are located opposite to the remaining wheels 46 relative to a plane extending through the longitudinal axis of the cylinder and the center line of the chassis body. In addition, because the wheels 44, 46 are all spaced from one another along the length of the body, a stable support base is defined for the chassis body which prevents the base from being easily moved from a position in proper alignment with the central longitudinal axis of the cylinder.

The adjustment screw 102 of the slide arm assembly 38 is loosened to permit the slide arm 98 to be moved to the left as shown in the figure to position the gauge 34 over one of the bearers of the transfer cylinder. Thereafter, the screw 102 is tightened to secure the slide arm in place. The nuts 88, 96 of the two articulating joints 66, 70 may then be loosened, if necessary, to bring the index finger 56 of the gauge into contact with the bearer. The arms 62, 64 preferably manipulated to orient the index finger in the radial direction of the cylinder so that all measurements made are true radial distances. Once the arms have been arranged to position the gauge properly on the bearer, the nuts 88, 96 are tightened so that no further relative movement between the gauge and the chassis is permitted.

After the height adjustment assembly 36 and slide arm assembly 38 are secure relative to the chassis, the dial 58 may be set to zero by either rotating the housing 54 relative to the hand 60 of the gauge, or by adjusting the position of the index finger and hand by rotating the adjustment screw 74 of the rocker arm 68.

After the radial height of the bearer has been established, and the dial set to zero, the adjustment screw 102 on the slide arm is loosened, and the slide arm is moved within the groove toward a retracted position in which the gauge 34 overlies the blanket 26. In this position of the slide arm 98, the index finger 56 contacts the blanket and is displaced in either a positive or negative radial direction relative to the position of the index finger at the zero position depending upon the overall thickness of the blanket and any packing material supported on the transfer cylinder.

For example, if the overall thickness of the blanket and packing material is greater than the radial distance between the circumferential section 22 of the cylinder and the bearer 20, the index finger is moved toward the housing of the gauge, causing the dial to indicate the distance of travel of the finger. Thus it is possible to calculate the overall height of the blanket in order to determine the amount of squeeze between the transfer and plate cylinders.

Rather than moving the slide arm 98 to position the gauge over the bearer or the blanket, it is possible to make the same measurement simply by lifting the apparatus from the cylinder once the height of the bearer is established, and repositioning the apparatus with the gauge in contact with the blanket so that the difference in radial height between the blanket and the bearer may be measured.

Figure 10:
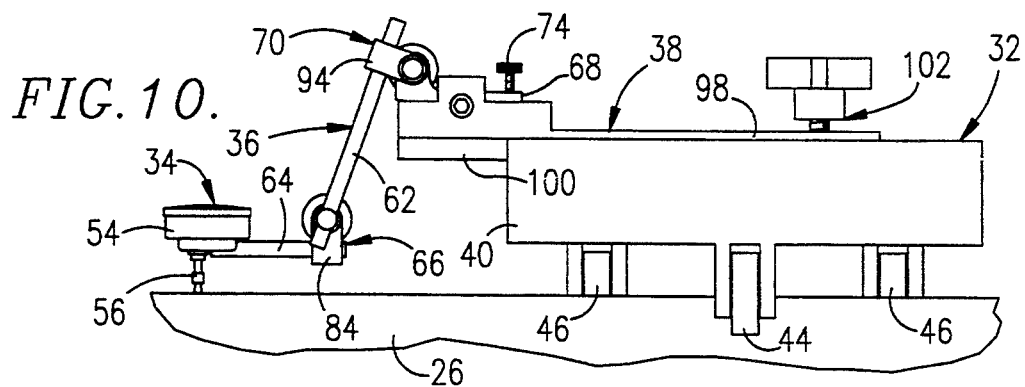
FIG. 10 is a side elevational view of a modified construction of the apparatus.

An alternate construction of the apparatus is shown in FIG. 10, and is identical to the apparatus described above in every respect except that only three wheels are provided on the chassis instead of four. The lone wheel 44 on the arm opposite the wheels 46 is positioned half the distance between the wheels 46 in the longitudinal direction of the chassis. By providing this construction, three-point contact exists between the chassis and the surface of the cylinder, which adds stability to the apparatus to enable increased accuracy and improved repeatability of measurements made by the apparatus.

Although the invention has been described with reference to the preferred embodiment illustrated in the attached drawing figures, it is noted that substitutions may be made and equivalents employed herein without departing from the scope of the invention as recited in the claims.

What is claimed is:

1. An apparatus for measuring radial distances relative to the surface of a cylinder formed about a central longitudinal axis, the apparatus comprising:

a chassis including a body having a center line adapted to be aligned parallel with the longitudinal axis of the cylinder, and first, second and third wheels for supporting the chassis on the cylindrical surface, the first and second wheels being rotatable about a first axis of rotation and the third wheel being rotatable about a second axis of rotation parallel to the first axis of rotation and disposed to a side of the center line opposite the first axis of rotation, the first, second and third wheels being offset from one another in the direction of the center line;

a gauge for measuring radial distances relative to the surface of the cylinder when the chassis is supported on the cylinder by the wheels;

a support means for supporting the gauge on the chassis, the support means including a height adjustment means for adjusting the height of the gauge relative to the chassis and a slide adjustment means for adjusting the position of the gauge relative to the chassis in a direction parallel to the center line.

2. An apparatus as recited in claim 1, wherein the chassis includes a fourth wheel that is rotatable about the second axis of rotation and is offset from the other wheels in the direction of the center line.

3. An apparatus as recited in claim 1, wherein the height adjustment means includes first and second elongated arms connected together by a first articulating joint, the gauge being mounted on the first arm, and the second arm being secured relative to the chassis by a second articulating joint so that both arms are movable relative to both the chassis and each other to position the gauge at a desired radial distance relative to the surface of the cylinder when the chassis is supported on the cylinder by the wheels.

4. The apparatus as recited in claim 3, wherein the height adjustment means includes a rocker arm that is pivotally supported relative to the chassis, the second articulating joint being provided between the rocker arm and the second arm so that movement of the rocker arm adjusts the radial height of the gauge; and an adjustment means for adjusting the position of the rocker arm relative to the chassis.

5. The apparatus as recited in claim 3, wherein the height adjustment means includes a means for securing the relative positions of the gauge, arms and chassis after adjustment so that a measurement of relative radial distances may be made along the length of the cylinder.

6. The apparatus as recited in claim 1, wherein the slide adjustment means includes a slide arm on which the height adjustment means is supported, the slide arm being mounted on the chassis and being movable relative to the chassis in a direction parallel to the center line.

7. The apparatus as recited in claim 6, wherein the slide adjustment means includes a means for securing the slide arm to the chassis after adjustment.

* * * * *